United States Patent [19]

Berdahl et al.

[11] Patent Number: 4,668,739

[45] Date of Patent: May 26, 1987

[54] POLY(PHENYLENE ETHER)-BOUND UV ABSORBER

[75] Inventors: Donald R. Berdahl, Schenectady; Susan A. Nye, Feura Bush; Gary W. Yeager, Schenectady, all of N.Y.

[73] Assignee: General Electric Company, Schenectady, N.Y.

[21] Appl. No.: 812,660

[22] Filed: Dec. 23, 1985

[51] Int. Cl.⁴ .............................................. C08G 65/44
[52] U.S. Cl. .................................... 525/132; 525/153; 528/212; 528/218; 528/219
[58] Field of Search ................ 525/132, 153; 528/212, 528/218, 219

[56] References Cited

U.S. PATENT DOCUMENTS

| | | | |
|---|---|---|---|
| 4,218,364 | 8/1980 | Cooper et al. | 524/131 |
| 4,254,234 | 3/1981 | Goto | 525/153 |
| 4,391,950 | 7/1983 | Cooper | 525/132 |
| 4,537,948 | 8/1985 | Bartmann et al. | 528/215 |

OTHER PUBLICATIONS

Khim Oo and Menashe Tahan, *European Polymer Journal*, 13, 915–919 (1977).
Bailey et al., "Functional Polymers", *Macromolecules*, 11, 312–320 (1978).
Luston et al., "Polymeric UV-Absorbers of 2-Hydroxybenzophenone", *J. Macromol Sci.-Chem.*, A7 (3), 587–599 (1973).
Fertig et al., *Journal of Applied Polymer Science*, 10, 663–672 (1966).
Luston et al., *J. Polymer Sci., Poly. Sym.* 40, 33–42 (1973).
Kamogawa et al., *Polymer Letters Edition*, 15, 675–677 (1977).

*Primary Examiner*—Lucille M. Phynes
*Attorney, Agent, or Firm*—James Magee, Jr.; James C. Davis, Jr.

[57] ABSTRACT

UV stabilized polyphenylene ether polymers and blends thereof are provided by this invention. This is accomplished by bonding UV absorbers directly to the polyphenylene ether chain or by polymerizing monomers to which the UV absorbers are bound.

10 Claims, No Drawings

POLY(PHENYLENE ETHER)-BOUND UV ABSORBER

This invention is directed to polyphenylene ether polymers having improved resistance to ultraviolet radiation. More particularly, this invention is directed to polyphenylene ether polymers having ultraviolet radiation absorbers bound thereto. Both the polymer compositions and the blends thereof exhibit improved resistance to ultraviolet radiation while minimizing the loss of dimensional stability.

BACKGROUND OF THE INVENTION

The term "polyphenylene ether resin" includes a family of polymers well known to those skilled in the art and described in numerous publications including Hay, U.S. Pat. Nos. 3,306,874 and 3,306,875. The high molecular weight polyphenylene ethers are high performance engineering thermoplastics possessing relatively high softening points and are useful for many commercial applications including films, fibers and molded articles.

As is common with other thermoplastic polymers, polyphenylene ethers undergo photodegradation from prolonged exposure to ultraviolet radiation. This photodegradation is exhibited by a change in color, more particularly, an increase in yellowness due to the formation of yellow color bodies on the surface. Their resistance to ultraviolet radiation can be increased significantly by addition of ultraviolet radiation absorbers. The use of ultraviolet radiation absorbers to provide protection against photodegradation in resins is known to the art. These ultraviolet radiation absorbers (UV absorbers) function by reason of their high absorptivity of damaging ultraviolet wavelengths relative to that of the polymer. Common UV absorbers include benzophenones and benzophenone derivatives, benzotriazoles and benzotriazole derivatives.

Although these UV absorbers provide adequate UV stability, the addition of these components is often accompanied with a loss of desired physical properties of the polyphenylene ethers and their blends. In particular, the heat distortion temperature is lowered to an unacceptable degree, resulting in a loss of dimensional stability.

The present invention overcomes these difficulties by incorporating UV absorbers onto the polyphenylene ether polymer. Therefore, separate additives which diminish the physical properties need not be introduced.

SUMMARY OF THE INVENTION

A UV stabilized polyphenylene ether polymer is provided which comprises one or more monomeric units of the formula

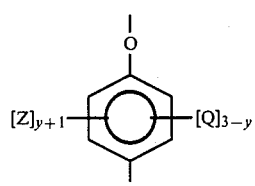

wherein
Z is of the formula

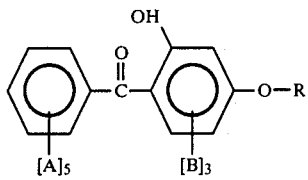

A is a member of the class consisting of
(i) monovalent radicals selected from the group consisting of alkyl and alkoxy of from 1-20 carbon atoms, halogen, hydrogen, cycloalkyl of from 4-18 carbon atoms and aromatic of from 6-20 carbon atoms;
(ii) divalent organic radicals which provide the bond to the benzene ring of formula I, said divalent radicals being selected from the group consisting of alkylene and oxyalkylene of from 1-20 carbon atoms, cycloalkylene of from 4-18 carbon atoms and aromatic of from 6-12 carbon atoms; and
(iii) combinations with adjacent A radicals which provide aromatic nuclei selected from the group consisting of unsubstituted aromatic nuclei and aromatic nuclei substituted with from 1-4 monovalent radicals defined by B below;

B is a member of the class consisting of
(i) monovalent radicals selected from the group consisting of alkyl and alkoxy of from 1-20 carbon atoms, halogen, hydrogen, cycloalkyl of from 4-18 carbon atoms; and
(ii) divalent organic radicals which provide the bond to the benzene ring of formula I, said divalent radicals being selected from the group consisting of alkylene and oxyalkylene of from 1-20 carbon atoms, cycloalkylene of from 4-18 carbon atoms and aromatic of from 6-12 carbon atoms;

R is selected from the class consisting of
(i) alkyl radicals of from 1-18 carbon atoms and
(ii) divalent organic radicals which provide the bond to the benzene ring of formula I, said divalent radicals being selected from the group consisting of alkylene or from 1-18 carbon atoms, cycloalkylene of from 4-18 carbon atoms and aromatic of from 6-18 carbon atoms;

each Q is a monovalent radical independently selected from the group consisting of hydrogen, halogen, primary or secondary alkyl of from 1-7 carbon atoms, phenyl, haloalkyl, hydrocarbonoxy and halohydrocarbonoxy wherein at least 2 carbon atoms separate the halogen and oxygen atoms; and
y is 0 or 1.

OBJECTS OF THE PRESENT INVENTION

An object of the present invention is to provide UV stabilized polyphenylene ether resins and blends thereof.

Another object of the present invention is to provide UV stabilized polyphenylene ether resins and blends thereof which do not require the separate addition of UV absorbers.

A further object of the present invention is to provide a UV absorber/monohydroxy compound which can be copolymerized to provide UV stabilized polyphenylene ether resins.

An additional object of the present invention is to provide UV stability to polyphenylene ether resins and blends thereof without a significant loss of their heat distortion temperatures.

DETAILED DESCRIPTION OF THE INVENTION

In accordance with the present invention, there is provided a UV stabilized polyphenylene ether polymer having the monomeric units described more particularly in formula I above. These monomeric units provide UV stability to the polyphenylene ether polymers by incorporating benzophenone functional groups into the polymer. As indicated above, benzophenones and their derivatives are known to have a high absorptivity of damaging wavelengths and provide UV stability to polymer resins when introduced in bulk as a separate component.

Not wishing to be bound by theory, it is believed that the dissipation of absorbed energy (hν) is due to the thermal reversal (Δ) of a photoenolization process.

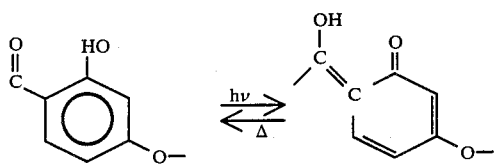

Having hydroxy positioned ortho with respect to the carbonyl group is believed to provide the necessary resonant structures. Therefore, the radicals represented by A and B can be varied widely subject to the proviso that these species do not interfere with the resonant structures or the absorption of ultraviolet light. Parahydroxy, alkoxy and aryloxy radicals enhance the amount of absorption at the desired wavelengths of about 300-330 nm.

Both A and B are preferably monovalent radicals and are most preferably hydrogen. The bond to the benzene ring of formula I is preferably provided by the divalent radicals defined by R. These divalent radicals are preferably alkylene of from 1-3 carbon atoms and most preferably methylene. The monovalent radicals Q are preferably hydrogen and methyl, most preferably methyl when ortho-positioned to the oxygen linkage and most preferably hydrogen when meta-positioned to the oxygen linkage.

The UV stabilized polyphenylene ethers of this invention may be obtained by incorporating benzophenones and/or their derivatives into polyphenylene ether polymers. These polyphenylene ether polymers generally comprise structural units having the formula below:

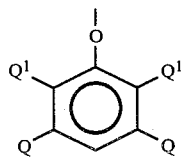

In each of said units independently, each Q is independently hydrogen, halogen, primary or secondary lower alkyl (i.e., alkyl containing up to 7 carbon atoms), phenyl, haloalkyl, hydrocarbonoxy, or halohydrocarbonoxy wherein at least 2 carbon atoms separate the halogen and oxygen atoms, each $Q^1$ is independently selected from the radicals defined by Q and additionally aminoalkyl groups.

Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3-or 4-methylpentyl and the corresponding heptyl groups. Examples of secondary lower alkyl groups are isopropyl, sec-butyl and 3-pentyl. Preferably, any alkyl radicals are straight chained rather than branched. Most often, each ortho-positioned Q is alkyl or phenyl, especially alkyl groups of 1-4 carbon atoms and each para-positioned Q is hydrogen. The most preferred polyphenylene ether resin for the purposes of the present invention is poly-2,6-dimethyl-1,4-phenylene(ether).

The polyphenylene ethers used to generate the UV stabilized compositions of this invention generally have a molecular weight (number average, as determined by gel permeation chromatography whenever used herein) in the range of about 5,000 to 40,000; and its intrinsic viscosity is most often in the range of 0.45-0.5 dl./g., as measured in chloroform at 25° C.

These polyphenylene ethers may be prepared by known methods, typically by the oxidative coupling of at least one monohydroxy aromatic compound. Such methods are described more particularly in the patents of Hay, referenced above and generally comprise passing an oxygen-containing gas through a reaction solution of a phenol and metal amine complex catalyst. Utilizing 2,6-xylenol provides the preferred polyphenylene ether indicated above.

Many methods for producing the polymers of this invention are contemplated, such as acylation, alkylation, halogen displacement and Friedel-Crafts reactions.

A preferred method for obtaining the UV stabilized polyphenylene ethers of this invention is to initially halogenate a polyphenylene ether polymer at the primary carbons of the lower alkyl radicals and displace the halogen with benzophenone. Where the radicals Q are haloalkyl or halohydrocarbonoxy, this halogenation step may not be necessary. Methods for halogenating polyphenylene ethers are well known to those skilled in the art. Common bromination procedures as described in *Chemical Abstracts*, CA 83 147996 and CA 82 140962, are suitable. In U.S. Pat. No. 4,468,501, Zampini et al. describe a process wherein polyphenylene ethers are halogenated by a free radical reaction with chlorine or bromine within a solvent medium heated to reflux, such as chlorobenzene. Such conditions favor halogenation of the carbons on the Q radicals and not those on the phenyl nucleus.

Another common method is to utilize the brominating agent N-bromosuccinimide. Bromination can proceed by adding this reagent to a solution of polyphenylene ether polymers and heating the solution to a temperature of about 115° C. or by irradiating the solution with visible light when at a lower temperature. Such bromination also favors the Q radicals. About 30-35% of the Q radicals are halogenated by these processes after about 2-3 hours. A higher degree of halogenation can be obtained by repeating these processes or by extending their duration. Lower levels of halogenation can also be obtained by shortening their duration. It may be desirable to control the level of halogenation so the incorporation of UV absorbers can be similarly controlled.

These halogenated polyphenylene ethers are then reacted with a benzophenone to bind these compounds to the polyphenylene ether chain. Suitable benzophenones are those which are known to function as UV absorbers. These are generally of the formula below:

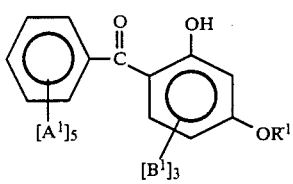

II

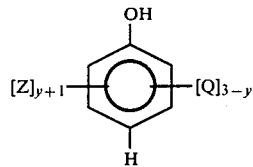

III wherein $A^1$ and $B^1$ are the monovalent radicals of A and B defined above, respectively or hydroxy and $R^1$ is hydrogen or lower alkyl of from 1–7 carbon atoms and is preferably hydrogen. To avoid crosslinking, it is preferable for the benzophenone to have only two hydroxy groups, with one ortho-positioned to the carbonyl. Therefore, where one of the monovalent radicals of $A^1$ or $B^1$ are hydroxy, $R^1$ is preferably lower alkyl of from 1–7 carbon atoms. Examples of suitable UV radiation absorbers are those compounds described by Olson in U.S. Pat. No. 4,322,455 and those disclosed in U.S. Pat. Nos. 3,309,220, 3,049,443 and 2,976,259, all of which are incorporated herein by reference. Some non-limiting examples of these compounds include:

2,4-dihydroxybenzophenone;
2,4-dihydroxy-4'-methoxybenzophenone;
2,4-dihydroxy-4'-ethoxybenzophenone;
2,4-dihydroxy-4'-propoxybenzophenone;
2,4-dihydroxy-4'-butoxybenzophenone;
2,3-dihydroxy-4-methoxy-4'-propoxybenzophenone;
2,3-dihydroxy-4-methoxy-4'-butoxybenzophenone;
2,3-dihydroxy-4-ethoxy-4'-propoxybenzophenone;
2,3-dihydroxy-4-ethoxy-4'-butoxybenzophenone; and
the like.

The halogens which appear on the primary carbons of the radicals on polyphenylene ethers can be displaced by the benzophenones described above by methods which are commonly known. An example of such a method is described in Japanese Pat. No. 74-01,545, assigned to Mitsubishi Chemical Industries Co. Displacement of the halogen can easily be achieved by reaction in the presence of an inorganic base at an elevated temperature. Suitable temperatures fall above 80° C. Suitable bases include potassium carbonate, potassium hydroxide, sodium hydroxide and the like. Those bases which react with the carbonyl moiety of a benzophenone are unsuitable. Many organic amines will provide these side reactions and are, therefore, undesirable.

This dissociation reaction preferably takes place in the presence of a dipolar aprotic solvent, such as dimethylformamide, dimethyl acetamide and dimethylsulfoxide, n-methyl-2-pyrrolidone, and the like.

It is not necessary to displace 100% of the halogens to achieve the desired objects of the present invention. A portion of the halogens may remain undissociated. It is generally preferred to incorporate a sufficient quantity of benzophenones to provide a concentration within the final polyphenylene resin or blend ranging from about 1 to 10 weight percent of the benzophenone, i.e., the monovalent radical Z, based on the total resinous components. The extent of incorporation can vary widely however, from incorporation onto one phenylene unit to incorporation onto about 100% of the phenylene units. High levels of incorporation may be desired where the UV stabilized polyphenylene ethers will be blended with unstabilized polymers.

Also provided by this invention are the UV absorber/monohydroxy compounds of the formula wherein Z and y are as defined above subject to the proviso when y=1, the radicals Z are not ortho-positioned with respect to each other. The preferred species for these radicals are also as defined above. These monohydroxy compounds can be used to produce the UV stabilized polyphenylene ether polymers of this invention.

The UV absorber/monohydroxy compounds of formula III can be made by incorporating a halogen on the primary alkyl carbon atoms of the monohydroxy compounds shown below:

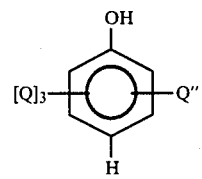

wherein Q is as defined above and Q" is methyl or an alkyl radical of from 2–7 carbon atoms having a terminal olefinic functionality. The monohydroxy compound is preferably 2,6-xylenol.

Prior to halogenation, the hydroxy compound is "protected" by reaction with a carboxylic acid derivative to form an ester on the benzene ring. This prevents competing side reactions due to the presence of the hydroxy.

When Q" is methyl, halogenation can be achieved by direct bromination with the brominating agent N-bromosuccinimide as described above for producing the polymers of this invention. Where Q" has terminal olefinic functionality, the desired incorporation of halogen on the primary carbons may be achieved by hydrobromination in the presence of peroxides. An example of a hydrobromination reaction is to bubble HBr through a solution of the "protected" monohydroxy compound with a peroxide, such as dibenzoylperoxide.

These primary halogen or halogens are then displaced with benzophenone or one of its derivatives. The displacement of the halogen is preferably accomplished with the base potassium carbonate in the presence of a dipolar aprotic solvent as described above for producing the polymers of this invention. Once the displacement is complete, the protective ester group is removed by hydrolysis with aqueous base.

The UV stabilized monohydroxy compounds of this invention can be copolymerized with other monohydroxy compounds which are not sterically hindered by large functional groups at the ortho positions. Suitable monohydroxy compounds for copolymerization include those of formula IV wherein Q is limited to the group consisting of hydrogen, halogen and lower alkyl of from 1 to 3 carbon atoms. Preferably, 2,6-xylenol is utilized in the copolymerization reaction. Of the UV absorber/monohydroxy compounds, those with only one benzophenone group incorporated thereon are preferred so as to minimize the steric effects in the copolymerization.

The polymers generated are random copolymers and the amount of UV stabilized monohydroxy compound incorporated in the copolymer can range from less than 1 weight percent to about 50 weight percent of the total copolymer. The preferred quantity of UV absorber/monohydroxy compound incorporated within the copolymer ranges from about 1 to 10 weight percent of the total polymer.

Copolymerization can be achieved by conventional oxidative coupling reactions known to the art. The Hay patents referenced above described suitable methods for oxidatively coupling the monohydroxy compounds of this invention. Other processes, such as those described in U.S. Pat. Nos. 3,914,266 and 028,341 are also suitable. Although there are various catalyst systems known to be useful in the preparation of polyphenylene ethers, it is important that those used in copolymerizing these monohydroxy compounds do not complex irreversibly with the carbonyl and/or hydroxy groups of the benzophenones. It is preferable to utilize catalyst systems consisting of copper. They are usually combinations of cuprous and cupric ions, halide ions (i.e., chloride, bromide or iodide) and at least one amine. Mixtures of organic amines are often preferred and include dibutylamines, di-t-butylethylenediamine and dimethylbutylamine. The source of copper ions is often cuprous oxide and the source of halide ions is preferably hydrogen bromide. In addition, it is often desirable to add an ammonium salt phase transfer catalyst. These phase transfer catalysts are characterized as having one methyl group and three long chain alkyl groups complexed to nitrogen. These phase transfer catalysts are available under the tradename Adogen TM and are described more particularly in U.S. Pat. No. 3,992,432, assigned to Ashland Chemical.

As indicated above, the polymers of this invention can be blended with unstabilized polyphenylene ether polymers to provide a resin blend with improved resistance to UV radiation. For such resin blends, it is preferable that the benzophenone incorporated in the polymer comprise about 1 to 10% by weight of the total resinous components.

The UV stabilized polyphenylene ethers of this invention are compatible with the styrene resins disclosed by Civek in U.S. Pat. No. 3,383,435. These are more particularly described as styrene resins having at least 25% of the polymer units derived from monomers having the formula:

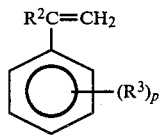

where $R^2$ is hydrogen, alkyl or alkylene of from 1 to 4 carbon atoms or halogen; $R^3$ is a member selected from the class consisting of vinyl, chlorine, bromine, hydrogen or alkyl of from 1 to 4 carbon atoms and p is from 0 to 5. These polystyrene resins typically exhibit a number average molecular weight of about 50,000 to 250,000. For the preferred styrene resins, R is hydrogen and p is 0 and such compositions comprise from about 99 to 100% by weight of the polystyrene resin.

Examples of suitable polystyrene resins include the homopolymers of polystyrene and rubber modified, high impact polystyrene resins. Examples of such resins include styrene acrylonitrile copolymers, styrene butadiene copolymers, styrene-acrylonitrile-butadiene copolymers, styrene-maleic anhydride copolymers, styrene-ethylvinylbenzene copolymers, styrene-divinylbenzene copolymers, styrene-butadiene block copolymers, styrene-butadiene-styrene block copolymers, styrene-butadiene-maleic anhydride block copolymers and styrene-tertbutyl copolymers.

The polystyrene resins can comprise from 1 to up to 75% by weight of the total resinous components within the UV stabilized polyphenylene ethers of this invention. The polyphenylene ether portion of these blends preferably range from 2 to 95% by weight. This polyphenylene ether portion can comprise a mixture of both UV stabilized and unstabilized polyphenylene ethers. To provide UV stability to these blends, it is preferable for the benzophenone incorporated in the polymer to comprise from 1 to 10 weight percent of the total composition.

Other additives may be introduced to these UV stabilized polyphenylene ether resins and their blends, such as plasticizers, pigments, impact modifiers, flame retardants, fillers, stabilizers, anti-static agents, mole release agents, etc. in amounts up to about 30%, preferably 15% by weight of the total composition. Chemical compounds useful for these purposes and the quantities necessary to provide the desired additive effect will be apparent to those skilled in the art. It is particularly desirable to introduce phosphorus compounds such as triphenylphosphate which provide both plasticization and flame retardance to these compositions. These additives are available commercially from FMC Chemical under the tradename Kronitex TM 50.

The method for preparing the blends of this invention is not critical, with prior art blending techniques being suitable. For example, extruding the blend and chopping it into pellets suitable for molding may be achieved by means conventionally used to prepare unstabilized polyphenylene ether blends.

The UV stabilized polymers and blends thereof may be shaped into films, fibers and molded articles in a manner similar to unstabilized polyphenylene ether polymers. The resins and blends obtained by this invention have superior heat distortion temperatures when compared to conventional UV stabilized polyphenylene ether blends. By incorporating the UV absorber into the polymer, the additive does not significantly detract from the other properties of polyphenylene ether. Higher glass transition temperatures are noted for blends of this invention having comparable UV stability to blends with bulk-added UV absorbers.

The following examples describe the principles and practice of this invention. It is not intended to limit the scope of this invention to the embodiments described therein.

EXAMPLE 1

This example demonstrates the use of n-bromosuccinimide in brominating the polyphenylene ethers.

To 48 grams of poly(2,6-dimethyl-1,4-phenylene) ether (IV 0.49 dl./g.) in carbon tetrachloride (500 ml.) at reflux were added 17.8 grams (0.10 mole) of N-bromosuccinimide. The solution was irradiated with a 150 watt flood lamp 10 centimeters away. After about 2.75 hours, the reaction was filtered to remove succinimide and the polymer was precipitated by adding the filtrate to an excess of methanol in a blender. The precipitate was washed with methanol thoroughly and dried at 60° C. and 10 torr overnight. The product was a pale yellow solid weighing 51 grams. Bromine analysis indicated 18 mole percent monobromo units in the polymer.

EXAMPLE 2

This example demonstrates the displacement of halogen with benzophenone.

To a 600 milliliter solution of N-methyl-2-pyrrolidone were added 5.46 grams of 2,4-dihydroxybenzophenone, 3.52 grams of potassium carbonate and 9.6 grams of a poly(2,6-dimethyl-1,4-phenylene ether) containing 12.1 weight percent bromine by the benzylic bromination procedure of Example 1. The reaction mixture was heated to about 100° C. for about 8 hours. The reaction mixture was filtered and added to excess methanol in a blender to precipitate the polymer. The product was collected on a filter, washed with methanol, water and then methanol. The yield was greater than 45%. Analysis by NMR and UV indicated the polymer contained 8.3 mole percent benzophenone moieties.

EXAMPLE 3

This example illustrates the UV stability of blends containing the polymers of this invention.

Three blends were prepared in this example to compare UV resistance. These blends comprised a 50/50 mixture of polyphenylene ether portion and polystyrene plus 13 parts by weight (based on total resin) triphenylphosphate flame retardant. Blend 1 contained no UV absorber. Blend 2 contained the UV absorber Uvinil ®M-40 having the active ingredient 2-hydroxy-4-methoxybenzophenone. Blend 3 contained 5 parts by weight (based on total resins) of a UV stabilized polyphenylene ether as prepared in Example 2. This UV stabilized polyphenylene ether contained about 5 mole percent benzophenone moieties. These blends were then cast into films from chloroform solutions to test for yellowness.

YELLOWNESS INDEX TEST

The three films were irradiated in an HPUV Actinic exposure system to accelerate degradation caused by UV radiation. In this system films are irradiated with eleven 110 watt SHO fluorescent lamps and two 40 watt fluorescent lamps at a distance less than 24 inches. The temperature within the irradiation chamber was maintained within the range of about 30°-40° C. The SHO fluorescent lamps and the 40 watt fluorescent lamps were cycled on and off periodically. The ratio of on/off time provided a value of approximately 1.4. The total length of the test was approximately 390 hours. The total on time was calculated from radiometer readings. This radiometer is a UV detector used to periodically measure the UV irradiance of the lamps.

After exposure to the HPUV system, the films were analyzed to detect yellowness index values (ASTMD-1925) with the use of a Gardner XL-20 colorimeter, the results of which are shown in Table 1. In addition, the initial yellowness index (YI) at time=0 is indicated.

TABLE 1

| Blends | YI(O) | ΔY 136 hours | ΔY 302 hours | ΔY 390 hours |
| --- | --- | --- | --- | --- |
| 1 | 4.2 | 10.1 | 16.1 | 17.6 |

TABLE 1-continued

| Blends | YI(O) | ΔY 136 hours | ΔY 302 hours | ΔY 390 hours |
| --- | --- | --- | --- | --- |
| 2 | 6.0 | 1.6 | 4.8 | 6.0 |
| 3 | 19.9 | −6.4 | −3.2 | −2.2 |

This data illustrates that the blends which utilize UV stabilized polyphenylene ethers, show improved performance over unstabilized blends (reduced change in ΔY) and show equivalent performance to blends which contain an equivalent amount of bulk added UV stabilizer. The glass transition temperature (Tg) for blend 3 is found to be 114° C. while the glass transition temperature of blend 2 is reduced to 92° C.

EXAMPLE 4

This example demonstrates the synthesis of the UV absorber/monomers of this invention.

The protected monohydroxy compound, 1-acetoxy,2-(2 propenyl)-6-methylbenzene was the starting material. Halogenation was achieved by bubbling HBr through a hexane solution (250 ml.) of the starting material (61.3 g, 0.323 moles) and dibenzoyl peroxide (2 g) for 2 hours. The reaction mixture was washed twice with saturated $NaHCO_3$ solution (2×200 ml.) and once with $H_2O$. The hexane layer was dried over $Na_2SO_4$ and the solvent evaporated. The desired 1-acetoxy,2-(3-bromopropyl)-6-methylbenzene was isolated by distillation. The % yield was 58.1% (40.84 g, BP=164°-166° C. at 0.03 Torr).

Bromine dissociation of the compound described above was achieved by reacting 2,4-dihydroxybenzophenone (2.5 grams) in the presence of potassium carbonate (1.61 grams) with 3.16 grams of the brominated species described above. UV and NMR analysis indicated approximately 100% dissociation occurred to provide about a 79% yield of a "protected" UV absorber/monohydroxy compound: 2-hydroxy-4-[3-(2-acetoxy-3-methylphenyl)propyloxy]benzophenone.

To remove the protective acetoxy group from this compound, 34.84 grams were stirred under nitrogen at reflux with 95% ethanol (200 ml.) and 1N KOH (175 ml.) for 2.5 hours. After cooling, the reaction mixture was poured into ice/10% HCl (70 ml.). The UV absorber/monohydroxy product was recovered as a precipitate. A total yield of 84% was obtained after recrystallization.

Copolymerization of the 2-hydroxy-4-[3-(2-hydroxy-3-methylphenyl)propyloxy]benzophenone, herein referred to as "the monomer", was achieved by reacting 2,6-xylenol in the presence of a conventional catalyst system. Approximately 15 weight percent of the monomer to 85 weight percent of 2,6-xylenol was utilized. The catalyst system comprised a mixture of dibutylamine (0.70 g), di-t-butylethylenediamine (0.22 g), dimethylbutylamine (2.42 g), cuprous oxide (0.47 g), HBr (0.39 ml.) and Adogen 336 phase transfer catalyst (0.40 ml. of 10 wt./vol. % toluene solution). Copolymerization took place in a solution of toluene (200 ml.) at approximately 40° C. Oxygen was bubbled through the reaction system.

The polymer was isolated by introducing the reaction mixture to an excess of methanol, which precipitated the polymer. The polymer was filtered off and washed with water and methanol. Gel permeation chromatography analysis, using polystyrene standard, showed a weight average molecular weight of 49,500 and a number average molecular weight of about 24,000. Proton NMR and UV visible spectrophotometry (CHCl$_3$) indicated a level of benzophenone moiety of about 6 mole percent. The glass transition temperature (Tg) of the polymer was approximately 201° C.

EXAMPLE 5

The following example illustrates the UV stability of blends containing the polyphenylene ether polymers produced in Example 4.

Three blends were prepared, each containing 50 parts by weight polyphenylene ether and 50 parts by weight crystalline polystyrene. Each blend also contained is parts by weight of a triphenylphosphate flame retardant known as Kronitex 50. Blend 2 additionally contained 5 parts by weight (based on the total resinous components) of the UV stabilizer Uvinil ®M-40 wherein the principle active ingredient is 2-hydroxy-4-methoxy-benzophenone. Within blend 3, a portion of the polyphenylene ethers comprised the UV stabilized copolymer produced in Example 4. This copolymer contained 6 mole percent benzophenone moieties and 0.5 grams of said polymer were added to provide about 5 parts by weight of the benzophenone moiety based on the total resinous components. The glass transition temperature of blend 3 was 107° C. while the glass transition temperature of blend 2 was 92° C. These blends were cast into films from a chloroform solution and were tested for changes in yellowness index values.

YELLOWNESS INDEX TEST

The three films were irradiated in an HPUV Actinic exposure system in accordance with the procedures described above in Example 3. Yellowness index values (ASTMD-1925) were measured on a Gardner XL-20 colorimeter. The results are shown in Table 2 below.

TABLE 2

| Blend | YI(O)[1] | ΔYI at 136 hrs. | ΔYI at 302 hrs. | ΔYI at 390 hrs. |
|---|---|---|---|---|
| 1 | 4.2 | 10.1 | 16.1 | 17.6 |
| 2 | 6.0 | 1.6 | 4.8 | 6.0 |
| 3 | 11.4 | −1.5 | 0.8 | 2.6 |

[1]Initial yellowness index value at time = 0.

Both the bulk added material and the UV stabilized polymer show significant improvement in UV stability over the unstabilized blend by a reduced change in the yellowness index values. The data indicates that blends containing the UV stabilized polyphenylene ether are comparable in performance blends containing a bulk added material.

Although the above examples have shown various modifications of the present invention, other modifications will be obvious to those skilled in the art and are considered within the scope of this invention.

What is claimed is:

1. A UV stabilized polyphenylene ether polymer having one or more chemically combined monomeric units of the formula

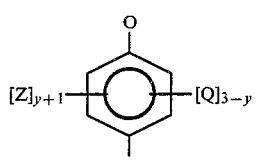

I wherein
Z is of the formula

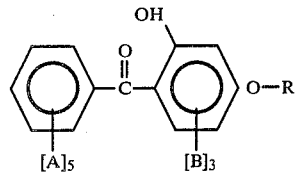

A is a member of the class consisting of
(i) monovalent radicals selected from the group consisting of alkyl and alkoxy of from 1-20 carbon atoms, halogen, hydrogen, cycloalkyl of from 4-18 carbon atoms and aromatic of from 6-20 carbon atoms;
(ii) divalent organic radicals which provide the bond to the benzene ring of formula I. said divalent radicals being selected from the group consisting of alkylene and oxyalkylene of from 1-20 carbon atoms, cycloalkylene of from 4-18 carbon atoms and aromatic of from 6-12 carbon atoms; and
(iii) combinations with adjacent A radicals which provide aromatic nuclei selected from the group consisting of unsubstituted aromatic nuclei and aromatic nuclei substituted with from 1-4 monovalent radicals defined by B below;
B is a member of the class consisting of
(i) monovalent radicals selected from the group consisting of alkyl and alkoxy of from 1-20, carbon atoms, halogen, hydrogen, cycloalkyl of from 4-18 carbon atoms; and
(ii) divalent organic radicals which provide the bond to the benzene ring of formula I, said divalent radicals being selected from the group consisting of alkylene and oxyalkylene of from 1-20 carbon atoms, cycloalkylene of from 4-18 carbon atoms anc aromatic of from 6-12 carbon atoms;
R is selected from the class consisting of
(i) alkyl radicals of from 1-18 carbon atoms and
(ii) divalent organic radicals which provide the bond to the benzene ring of formula I, said divalent radicals being selected from the group consisting of alkylene or from 1-18 carbon atoms, cycloalkylene of from 4-18 carbon atoms and aromatic of from 6-18 carbon atoms;
each Q is a monovalent radical independently selected from the group consisting of hydrogen, halogen, primary or secondary alkyl of from 1-7 carbon atoms, phenyl, haloalkyl, hydrocarbonoxy and halohydrocarbonoxy wherein at least 2 carbon atoms separate the halogen and oxygen atoms; and
y is 0 or 1.

2. A UV stabilized polyphenylene ether polymer as in claim 1 which comprises from about 1 to 25 mole percent of the monomeric units of formula I as defined in claim 1.

3. A UV stabilized polyphenylene ether polymer as in claim 1 wherein R is methylene, Q is methyl where ortho-positioned to the oxygen linkage and Q is hydrogen where para-positioned to the oxygen linkage.

4. A UV stabilized thermoplastic blend which comprises an effective amount of the UV stabilized polyphenylene ether polymer of claim 1, and a thermoplastic polymer selected from the group consisting of polyphenylene ethers, polystyrenes, polyesters, acrylics and polycarbonates.

5. A polymer as in claim 4 which contains from about 0.5 to 50% by weight of the UV stabilized polyphenylene ether polymer of claim 1, based on total resinous components.

6. A polymer blend as in claim 4 which comprises an amount of UV stabilized polyphenylene ether of claim 1 sufficient to provide about 1 to 10% by weight of the monovalent radical Z of formula I, based on total resinous components.

7. A polymer blend as in claim 6 which comprises from 2 to 95 parts by weight polyphenylene ether, and from 40 to 70 parts by weight high impact polystyrene.

8. A polymer blend as in claim 4, which additionally contains an effective amount of additives selected from the group consisting of plasticizers, pigments, impact modifiers, flame retardants, fillers, stabilizers, antistatic agents and mole release agents.

9. A UV stabilized polyphenylene ether polymer obtained by copolymerizing the UV absorber/monohydroxy compound of claim 1 with a monohydroxy compound of the formula

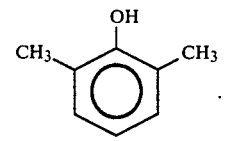

10. A UV stabilized polyphenylene ether polymer as in claim 9 which contains from 1 to 10 weight percent of UV absorber/monohydroxy compound.

* * * * *